US007724923B2

(12) United States Patent
Hamid (10) Patent No.: US 7,724,923 B2
(45) Date of Patent: May 25, 2010

(54) REMOVABLE SWIPE-IMAGING DEVICE AND METHOD FOR IDENTIFYING SAME

(76) Inventor: Laurence Hamid, 561 Brookridge Crescent, Ottawa, Ontario (CA) K4A 1Z3

( * ) Notice: Subject to any disclaimer, the term of this patent is extended or adjusted under 35 U.S.C. 154(b) by 879 days.

(21) Appl. No.: 10/173,942

(22) Filed: Jun. 19, 2002

(65) Prior Publication Data
US 2003/0053665 A1 Mar. 20, 2003

Related U.S. Application Data

(60) Provisional application No. 60/303,517, filed on Jul. 9, 2001.

(51) Int. Cl.
*G06K 9/00* (2006.01)
(52) U.S. Cl. ...................................................... 382/115
(58) Field of Classification Search .................. 382/195
See application file for complete search history.

(56) References Cited

U.S. PATENT DOCUMENTS

| | | | |
|---|---|---|---|
| 4,146,291 A * | 3/1979 | Goff et al. ..................... 439/90 |
| 4,353,056 A | 10/1982 | Tsikos | |
| 4,920,565 A * | 4/1990 | Strawczynski et al. ...... 380/257 |
| 5,109,427 A | 4/1992 | Yang | |
| 5,181,126 A * | 1/1993 | Morimoto ................... 382/239 |
| 5,187,482 A | 2/1993 | Tiemann et al. | |
| 5,187,748 A | 2/1993 | Lee | |
| 5,233,404 A | 8/1993 | Lougheed et al. | |
| 5,778,089 A | 7/1998 | Borza | |
| 5,872,834 A * | 2/1999 | Teitelbaum .............. 379/93.03 |
| 5,923,783 A * | 7/1999 | Kawauchi et al. ........... 382/233 |
| 5,982,914 A | 11/1999 | Lee et al. | |
| 5,995,630 A * | 11/1999 | Borza ........................... 380/54 |
| 6,076,167 A * | 6/2000 | Borza ............................ 726/5 |

(Continued)

FOREIGN PATENT DOCUMENTS

WO WO 01/42938 * 6/2001

OTHER PUBLICATIONS

Harvey, Mike. "Why veins could replace fingerprints and retinas as most secure form of ID." *Times Online* Nov. 11, 2008 <http://technology.timesonline.co.uk/tol/news/tech_and_web/articles 5129384.ece>.

*Primary Examiner*—Matthew C Bella
*Assistant Examiner*—Alex Liew
(74) *Attorney, Agent, or Firm*—Perkins Coie LLP (57) ABSTRACT

A removable swipe-imaging device and a method for identifying the device are disclosed. The removable swipe-imaging device is for limiting access to protected area to authorized individuals. The removable swipe-imaging device comprises a sensing pad with an integrated processor for processing sensed biometric image data; the processor comprising an encoding circuit for encoding the sensed biometric image data in response to a challenge received from a host processor, the encoded sensed image data for being transmitted to the host processor and decoded based on the challenge. The method for identifying the device comprises the steps of: providing a biometric sample to the sensor; capturing a biometric image indicative of the biometric sample for generating biometric image data; generating a challenge, the challenge stored in a storage medium in communication with a host processor; providing the generated challenge to the imaging sensor; encoding the biometric image data within the sensor in dependence upon the challenge; and, transmitting the encoded biometric image data to the host processor.

19 Claims, 8 Drawing Sheets

U.S. PATENT DOCUMENTS

| | | | |
|---|---|---|---|
| 6,084,977 A * | 7/2000 | Borza | 382/124 |
| 6,333,989 B1 * | 12/2001 | Borza | 382/124 |
| 6,446,210 B1 * | 9/2002 | Borza | 726/4 |
| 6,901,154 B2 * | 5/2005 | Dunn | 382/115 |
| 2002/0006202 A1 * | 1/2002 | Fruehauf et al. | 380/260 |
| 2002/0062286 A1 * | 5/2002 | Tedesco et al. | 705/45 |
| 2002/0126881 A1 * | 9/2002 | Langley | 382/124 |
| 2002/0140542 A1 * | 10/2002 | Prokoski et al. | 340/5.52 |
| 2003/0002719 A1 * | 1/2003 | Hamid et al. | 382/124 |
| 2003/0005310 A1 * | 1/2003 | Shinzaki | 713/186 |
| 2003/0110374 A1 * | 6/2003 | Yamamoto et al. | 713/155 |
| 2003/0172044 A1 * | 9/2003 | ShamRao | 707/1 |

* cited by examiner

REMOVABLE SWIPE-IMAGING DEVICE AND METHOD FOR IDENTIFYING SAME

This application claims priority from the U.S. Provisional Application Ser. No. 60/303,517 filed Jul. 9, 2001.

FIELD OF THE INVENTION

This invention relates generally to a method for imaging a biometric sample using swipe imaging devices and more particularly to a method of preventing the playback of a biometric sample.

BACKGROUND OF THE INVENTION

Computer security is fast becoming an important issue. With the proliferation of computers and computer networks into all aspects of business and daily life—financial, medical, education, government, and communications—the concern over secure file access is growing. Various approaches exist for securing access to buildings, computers, confined areas, and so forth.

It is well known to those skilled in the art that a security access system that provides substantially secure access and does not require a password or access code is a biometric identification system. Due to its inherent nature, biometric data has the advantage of always being available for user identification and verification. Fingerprint sensing and matching is a reliable technique for personal identification and/or verification.

Biometric-oriented personal identification techniques are becoming increasingly important in protecting personal property, as for example laptops or cellular phones, in preventing credit card and calling card fraud, in limiting access to security areas, computers and information, and in ensuring security for electronic commerce. Typically, a biometric identification system accepts unique biometric information from a user and identifies the individual by matching the information against information belonging to registered individuals of the system.

These techniques have the advantage that they move with the individual and are theoretically capable of great accuracy. Of all presently used biometric identification techniques, fingerprints are perhaps the most appealing. Fingerprints have been accepted for 75 years as a legal means for verifying identity "beyond all reasonable doubt", and acquiring a fingerprint requires little specific behavior by the user. Considerable research has gone into the task of extracting fingerprint features and performing database comparisons. Existing technology allows the relevant features of a fingerprint to be represented in a few hundred bytes of data, with recognition in less than 1 second, and with low false acceptance and false rejection rates of about 0.01%. The fingerprint is probably the most widely used and researched biometric identification technique. Furthermore, the computer hardware required for recording and comparing fingerprint data can be centralized and accessed through a telecommunications network thereby allowing costs to be amortized across many transactions. A variety of systems and methods are currently used to protect information and property from unauthorized access or interference.

Accurate and cost effective verification of personal identity is becoming increasingly important. However, all the methods proposed for electronic identification of individuals suffer a similar problem, which is to ensure that the token used is in the possession of its rightful owner.

An approach is proposed in U.S. Pat. No. 5,991,408 to Pearson et al. who disclose a system wherein a security key is created from one or more biometric elements of a user. In the case of a fingerprint, a user presses a finger on a sensor pad, which inputs a representation of the fingerprint into a computer system. The representation of the fingerprint is used to construct an instance of a problem which has data derived from the fingerprint as its solution. The instance of the problem is associated with the identity of the user. A code or feature can be inserted into the instance of the problem in order to serve as proof that the instance of the problem was generated in a secure fashion by a secure system or that it is otherwise reliable and uncorrupted. Further, a cryptographic key can be generated from the user's fingerprint and used to encrypt information.

One problem associated with remote fingerprint sensors concerns transmission of information used for verification. Therefore, it is often desirable to store or transmit information in an encrypted format so that even if the information falls into the hands of an unauthorized user, it cannot be accessed without the cryptographic key. A limitation of such an approach regards the costs associated with a reconfiguration of the fingerprint sensors. For example, in the case of swipe imaging devices such reconfiguration infers incorporating a chip including a processor having encrypting capacities compatible with such a requirement, adding further silicon layer to the sensor, increasing wiring, and so forth. This represents an expensive and a massive operation to upgrade security on all existing sensor devices. Even while encryption allows sensitive information to be securely transmitted or stored in publicly accessible areas, a cryptographic key can be lost, stolen, or given away then unauthorized users may have access to the encrypted information, which renders the whole security system obsolete.

Whereas the fingerprint is unique and cannot be easily duplicated, such is not the case for the electronic representation of the fingerprint. Knowledgeable individuals with incentive to gain access to a system can record such an electronic representation for use at a later time. Further, the signal providing access may be recorded for later use thus circumventing a security system.

Therefore, in view of the above-mentioned and other limitations of the prior art, there is a need of a system for preventing playing back a fingerprint to fraudulently gain access to a protected area by being falsely authorized by a host processor. A non-expensive system is of course a major advantage of the present invention.

OBJECT OF THE INVENTION

Thus, it is an object of this invention to provide a method for identifying a sensor device.

It is another object of the invention to provide a method for preventing someone from playing back a signal through a swipe-imaging sensor.

It is another object of the invention to provide a system that is simple enough to introduce to any swipe-imaging device.

It is another object of the invention to provide a system for adapting to the existing swipe imaging sensor without modifying the swipe-imaging sensor.

SUMMARY OF THE INVENTION

In accordance with the invention there is provided a method for identifying a sensor comprising the steps of: providing a biometric sample to the sensor; capturing a biometric image indicative of the biometric sample for generating biometric image data indicative of the biometric image; generating a challenge, the challenge stored in a storage medium in communication with a host processor; providing the generated challenge to the imaging sensor; encoding the biometric image data within the sensor in dependence upon the challenge; and transmitting the encoded biometric image data to the host processor.

In accordance with the invention there is provided a removable swipe-imaging device for generating encoded image data in response to a challenge provided by a host processor, the removable swipe imaging device having: a first transceiver for receiving a challenge from the host processor and for providing a response thereto; a sensing pad for sensing a biometric information sample passed thereacross; a processor integrated with the sensing pad, the processor for receiving sensed biometric image data of the biometric sample and for generating image data based on the biometric image; the processor comprising: an encoding circuit for encoding the sensed biometric image data in response to a challenge received at the first transceiver, the encoded sensed image data for being provided to the first transceiver for transmission to the host processor; wherein absent knowledge of the challenge, decoding the encoded image data by the host processor is not capable of being performed.

In accordance with the invention there is provided two storage media including:
  a first storage medium having instruction data stored therein for use in authorizing a sensor, the instruction data including instructions for the steps of:
  generating a challenge;
  storing the challenge in a storage medium in communication with a host processor;
  receiving encoded image data;
  decoding the encoded image data based on the challenge;
  performing one of authorizing the sensor and other than authorizing the sensor; and,
  performing a step of one of authenticating a user and failing to authenticate the user; and
  a second storage medium having instruction data stored therein for use in authorizing a sensor, the instruction data including instructions for the steps of:
  generating biometric image data indicative of a sensed biometric image;
  providing the generated challenge to the imaging sensor;
  encoding the biometric image data within the sensor in dependence upon the challenge; and,
  transmitting the encoded biometric image data to the host processor.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

Figure 1:
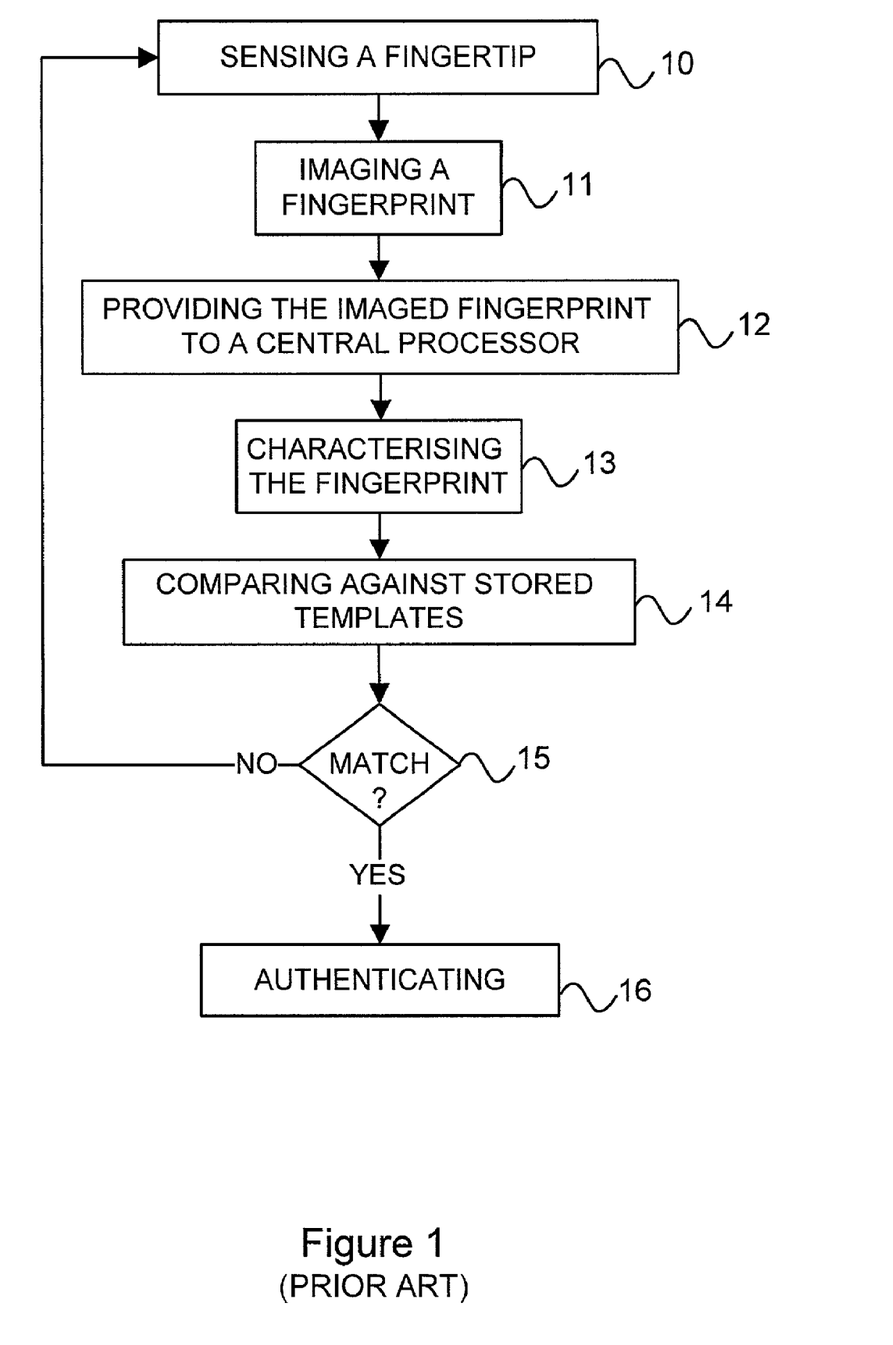
FIG. 1 is a simplified diagram of a prior art method of using a sensing device for authenticating an individual.

Referring to FIG. 1, a simplified diagram of a prior art method of using a sensing device for authenticating an individual is shown. In order to allow access of an individual to a computer, a building or any restricted area, the individual provides biometric information in the form for example of a fingertip to be imaged by a sensing device 10. In the case of a fingertip, the sensing device is in the form of a fingerprint imager, as for example a swipe fingerprint scanner employing a capacitive array. The fingertip is imaged in step 11, and a fingerprint is provided to a processor in step 12 for characterizing the fingerprint in 13. The further step 14 consists of comparing the fingerprint against templates previously stored in a memory. In dependence upon a result of the comparison in step 15, the individual is either authenticated in step 16 if a match is found or is prompted to try again the authentication process if the result of the comparison does not show a match.

Many devices as for example cell phones are protected with a fingerprint sensor that is associated with a sensing processor for authenticating a user in dependence on such a method. Typically, an owner presents their fingertip on a swipe-imaging sensor incorporated in the cell phone for activating the phone upon a match between the provided fingerprint and stored templates.

Alternatively, the sensing processor is programmable such that various users can make use of the phone but have personalized access to different type of calls, to limit access to long distance calls for example.

When using, for example, a swipe fingerprint scanner employing a capacitive array, damage to the array is a likely consequence. In order to render the device more cost effective, it would be advantageous to allow for easy swapping of the capacitive array of sensing elements. This would allow a user to replace the capacitive array in cases of failure due to use, harsh environments or vandalism. Unfortunately, if someone can swap the capacitive array, they can also insert their own connector into the mating connector for the array and thereby record the fingerprint while the fingerprint is provided to the central processor.

Figure 2:
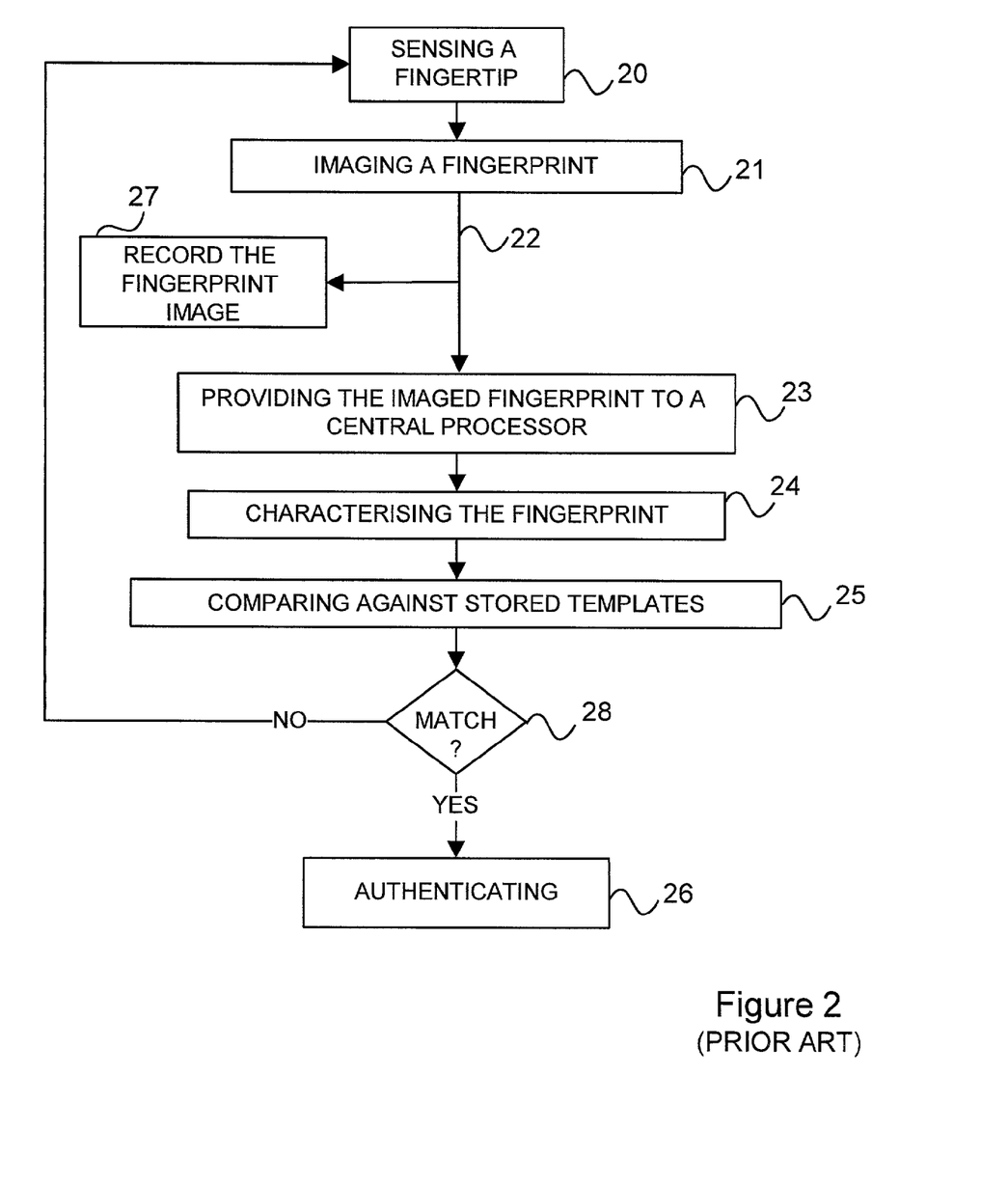
FIG. 2 is a simplified diagram of a prior art method of recording a fingerprint image during a communication step with a central processor.

FIG. 2 shows such a breach in the form of a simplified diagram method of recording a fingerprint image before the communication step with a central processor using a recording device fraudulently inserted in the sensing device. An individual provides biometric information in the form for example of a fingertip to be imaged by a sensing device in the form of a fingerprint imager in step 20, as for example a swipe fingerprint scanner employing a capacitive array. A processor associated with the sensing device, or a sensing processor images the fingertip in step 21; such an image, i.e. a fingerprint, is provided to a central processor in 23 for characterizing the fingerprint in step 24. Here, during the transmission step 22 of the fingerprint to the central processor, the fingerprint imaged is also transmitted in step 27 towards the recording device transparently to the individual.

A further step 25 comprises comparing the fingerprint against templates previously stored in a memory. In dependence upon a result of the comparison in step 28, the individual is either authenticated in step 26 if a match is found or is prompted to try again the authentication process if the result of the comparison does not show a match.

Figure 3:
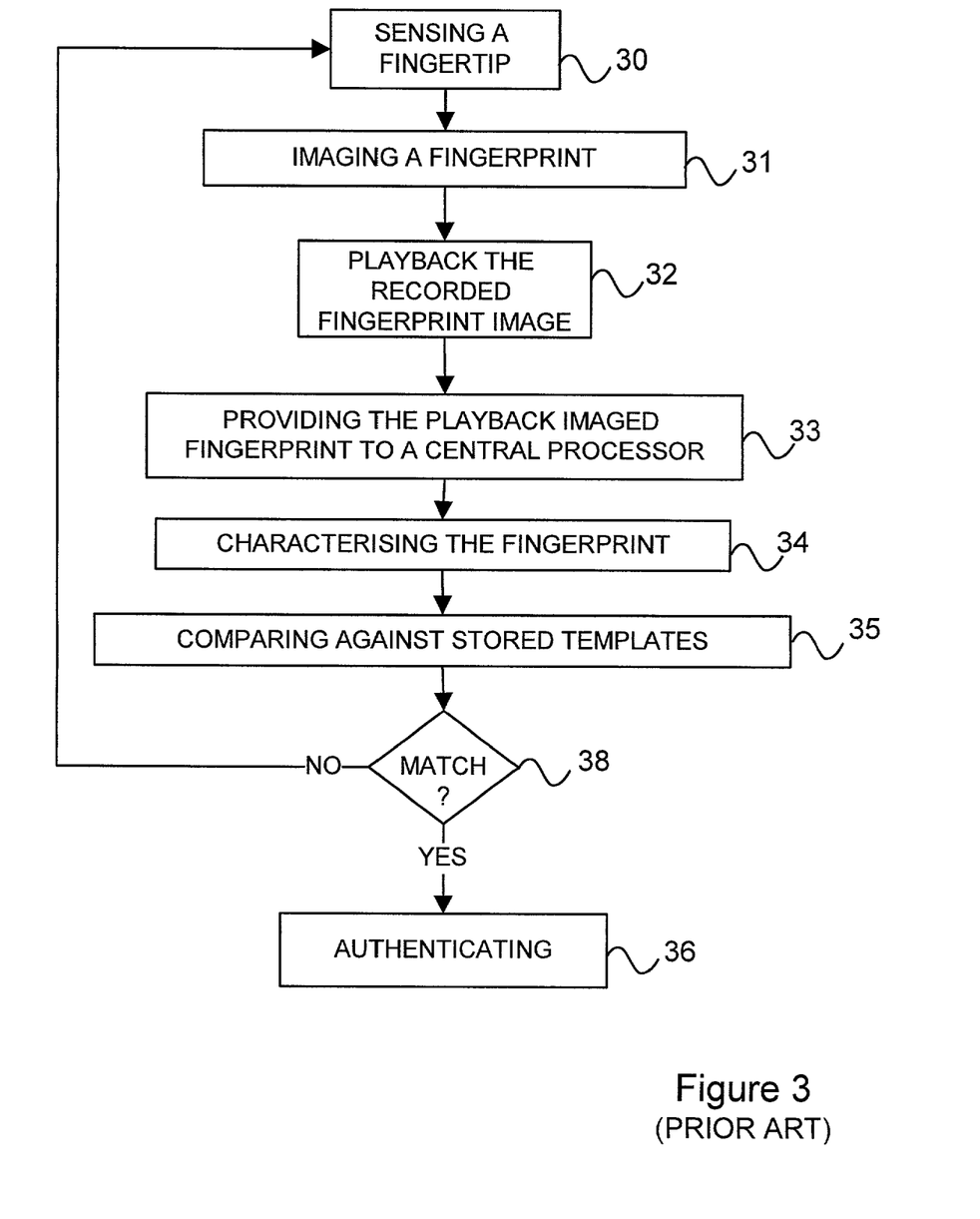
FIG. 3 is a simplified diagram of a prior art method of playing back the recorded fingerprint of FIG. 2.

Of course, the reason to introduce a recorder for recording a fingerprint is for eventually playing the recording back sooner or later in order to gain access to a restricted area protected by the sensing device. As shown in FIG. 3, a recorded fingerprint is played back 32 and provided to the central processor 33 instead of an image of a live-sensed 30 and imaged fingertip 31. Therefore, the fingerprint that is characterized by the processor in step 34 is the fingerprint provided by the playback recorder. Such a breach of security allows for easy implementation of record playback attacks wherein a small memory device is inserted into the socket and a capacitive array is then plugged into the memory array. The memory device records all data from the capacitive array for a period of time. The memory device is then removed and fingerprint data is extracted therefrom. It is then played back through the imaging array port to mimic an authorized user's attempt to gain access. Such an attack on security is difficult to defend against.

It is most likely that a result of a comparison of the playback fingerprint against stored templates in step 35 allows for an authentication of the owner of the recorded fingerprint in step 36, even though no fingertip was really sensed to provide a fingerprint. Therefore, the real user is authenticated for a fraudulent individual to get access to the restricted area protected by the sensing device.

Further, and importantly, sensors are typically interchangeable allowing any sensor to be used with any system since they each provide sensed data. For security purposes, this is undesirable. It would be advantageous to be able to identify a sensor based on the sensor type or manufacturer or designer in order to determine an origin of the sensor. This allows for verification of a sensor's "security" for use in security related applications.

In order to reduce the efficacy of such an attack, it is proposed to include within the imaging array an encoding circuit to encode the fingerprint to prevent authentication of a playback-recorded fingerprint. The encoding circuit is supported by a challenging system such that the encoding of the fingerprint is performed based on a challenge provided by the challenging system.

Figure 4:
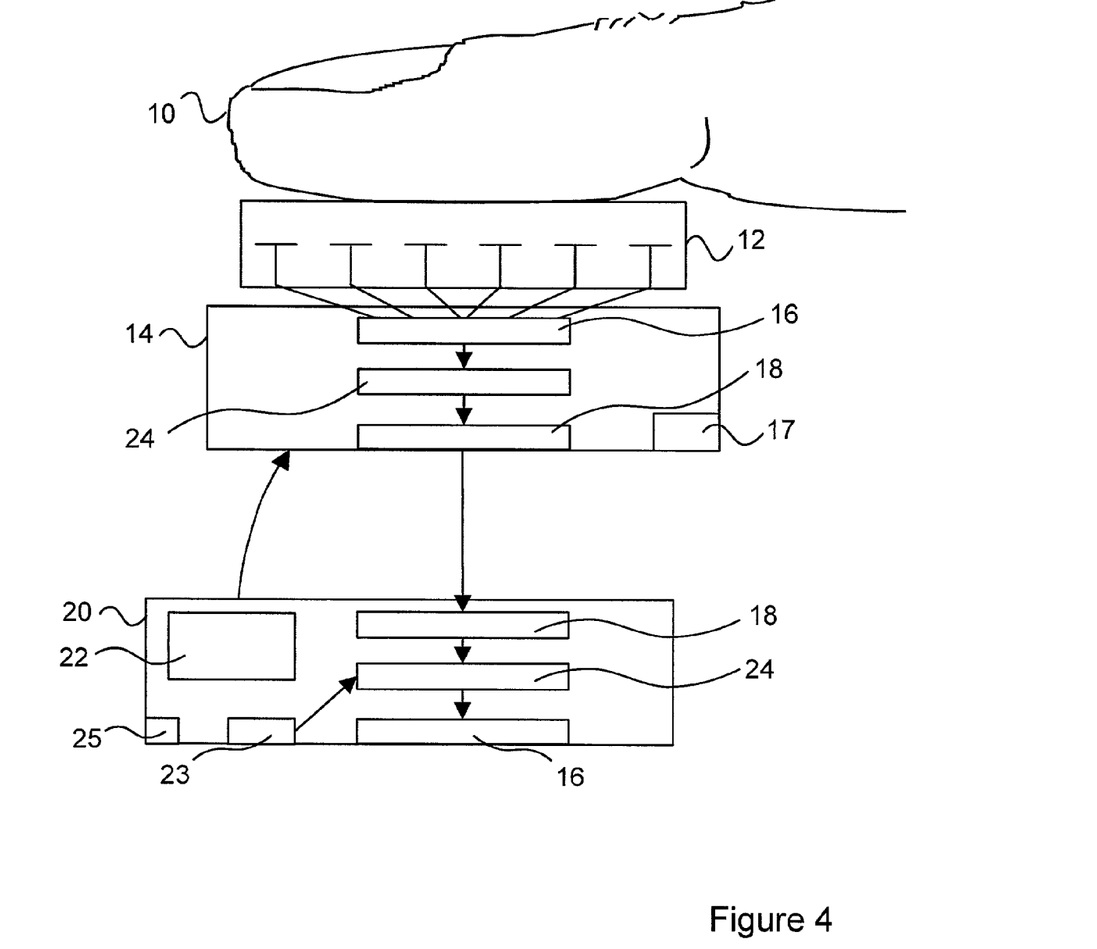
FIG. 4 shows a simplified diagram of the encoding circuit incorporated within the sensing device.

FIG. 4 shows a simplified diagram of the logical encoding circuit in the form of a processor incorporated within the sensing device. A user presents a fingertip 10 to contact a surface of the sensing device, the surface in the form of a sensing pad 12 of a swipe-sensing device using a capacitive array. Upon activation of the sensing device, for example, the host processor 20, which comprises a challenge generator 22, automatically generates and sends a challenge 24 to a sensing processor 14. Preferably, the challenge is temporarily stored in a volatile memory 23 such that the challenge is retrieved for use in an authentication process. The sensing processor 14 captures an image of the fingertip to generate image data 16; the image data 16 is processed in accordance with the challenge 24 received by the sensing processor 14. The process represents the encoding step of the image data. The process generates an encoded image data 18, which is then transmitted to the host processor 20. The host processor decodes the encoded image data 18 based on the provided challenge 24 for characterizing of the image data 16. The decoded image data is compared to templates stored in a memory for authenticating the user.

Eventually, upon a negative result of the comparison, the host processor 20 fails to authenticate the user. Therefore, the user is not authorized to access the protected area he has requested access to.

Advantageously, encoding an image data based upon a challenge does not require a drastic modification of the existing equipment. For example, a challenge is in a form of a string of zeros and ones as shown in the following example:

---

0 0 1 0 1 1 0 1 0 1 1 0 0 1 1 1 0 0 0 0 0 0 0 1

---

In this example, the challenge is composed of the 16 first bits 0010110101100111.

The eight last bits, 00000001 are for example indicative of a selection of encoding systems the sensing processor has to use for encoding the image data. Each of the eight bits has a specific meaning. For example, a "zero" indicates that this is not the encoding type selected; a "one" indicates the selected encoding system. Of course, the encoding of the image data can be the result of a combination of more than one compatible encoding system. An "exclusive/or, XOR", a "AND", a "OR", a "NOR", a "SWAP", a "ROT" and so forth, are among the various encoding system usable for encoding the image data.

Some of the encoding systems comprise more than one bit to provide more direction regarding the encoding to be done. For example in the case where a "SWAP" encoding system is selected, a "1" indicates such selection and further bits indicate which bit within the challenge is swapped with which other bit within the challenge.

A "SWAP" encoding system can be combined with another encoding system as for example a "XOR" system.

Optionally, the host processor comprises a clock 25 for providing a host time value indicative of the time the challenge was generated. Further optionally, the encoding circuit comprises a clock 17 for providing a sensing time value associated with the transmitted encoded image data.

Of course, a comparison of the host and sensing time values provides a further indication that the transmitted encoded data is from a non-recorded image data.

Alternatively, the encoding system is based upon the host time value provided along with the challenge, which introduces a non-controllable parameter enhancing the difficulty to transmit an encoded image that is accepted by the host processor for authenticating process. Further, this decreases the possibility for the host processor to authenticate a played-back recorded fingerprint, which eventually comprises a time value, but a time value different from the host time value provided along with the challenge.

Figure 5:
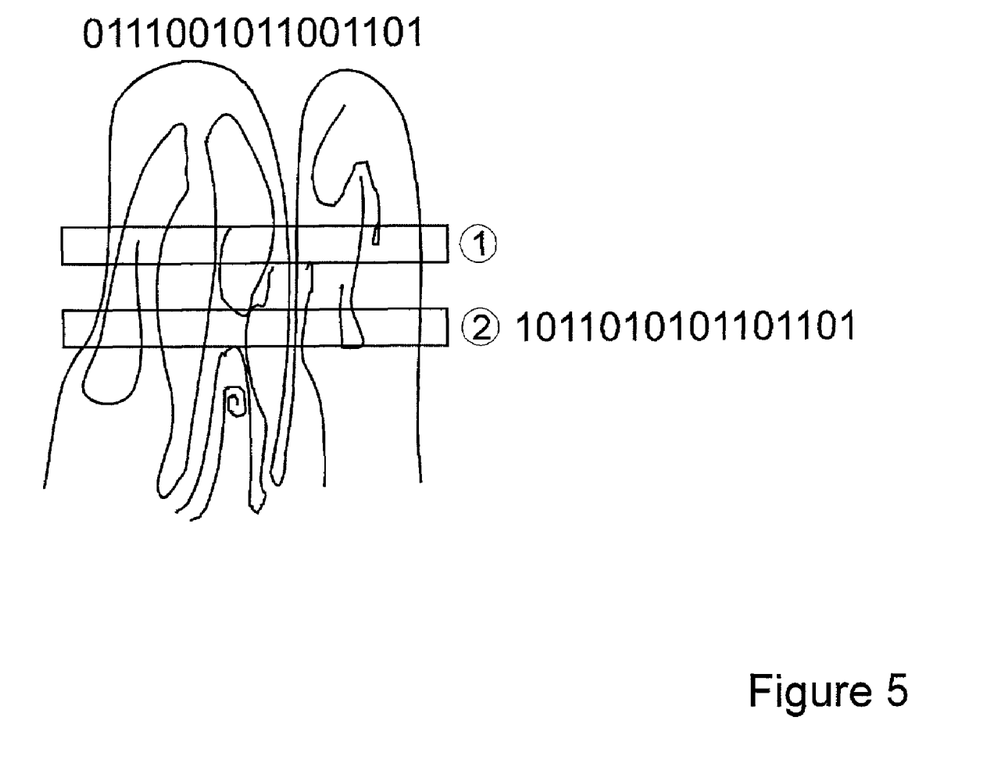
FIG. 5 is an example of an enlarged portion of a fingerprint.

Referring to FIG. 5, an example of an enlarged portion of a fingerprint is shown. Two domains, 1 and 2, have been transformed in image data representative of the ridges and valleys of the fingerprint. In this transform, the "zeros" indicate valleys, and the "ones indicate ridges sensed by the capacitive array of the sensing pad of the swipe imaging device. The domain 1 is represented by the 16-bits string 0111001011001101, whereas the domain 2 is represented by the 16-bits string 1011010101101101.

Referring back to the previous 16-bits challenge example, assuming that only one encoding system is selected, and this is an exclusive/or encoding system, and assuming that an image data is in the form of string of 16 bits representative of domain 1, the encoding process resulting is:

| | |
|---|---|
| Challenge: | 0010110101100111 |
| Image data: | 0111001011001101 |
| XOR encoding result: | 0101111110101010 |

The encoded image data 18, which in the present example corresponds to the XOR encoding result, is transmitted to the host processor 20, which retrieves the challenge from the memory 23. The host processor decodes the encoded image data 18 based on the challenge 24.

| | |
|---|---|
| Encoded image data: | 0101111110101010 |
| Challenge: | 0010110101100111 |
| Decoded image data: | 0111001011001101 |

Once decoded, the image data is processed according to an authentication process such as a comparison of the image data with stored templates. Depending on the result of the comparison, the processor authenticates or fails to authenticate the user.

Of course, if the image data has been encoded according to a system not expected by the host processor, the image data is not further processed.

Similarly, if the image data received by the host processor has not been encoded, the host processor does not further process the image data.

Alternatively, a user presents again a fingertip to the sensing pad for providing another image data to the sensing processor such that an entire authentication procedure including the encoding of the image data is performed again.

Preferably, once an authorization/verification has been done, the content of the volatile memory 23 is erased to prevent any attempt to record and playback at this stage of the process.

Advantageously, such encoding circuit is simple to manufacture and does not require a lot of space on a chip, which is compatible with the size of the sensing device. Furthermore, processing an image data using an encoding system as the one described above, or the like, does not lengthen the processing of the image data.

Optionally, the choice for selecting at least an encoding system is large, and the sensing processor chooses the encoding system among a plurality of encoding system present in the selection portion of the challenge sent to the sensing processor.

Optionally, the challenge comprises the information of the at least an encoding system to select from the selection of encoding systems.

As is apparent to a person with skill in the art, to include an encoding circuit in the sensing device does not prevent an ill-intentioned person to remove it and insert another device in the system for playing back a recorded fingerprint. In such a case, upon activation of a false sensing process, the host processor generates a challenge. An encoded image data is sent to the host processor. However, the encoding of the image is not based on the provided challenge. Therefore, the host processor refuses to further process the encoded image received.

Alternatively, the host processor may still have in memory the last encoded image data that someone tries to re-authenticate but the chance that the challenge is the same is less than 1 out of more that 65000 if the challenge is a 16-bit message. In such a circumstance, the host processor refuses to authenticate the fingerprint.

Of course, instead of XOR, other reversible logical operators are usable. For example, the encoding system or logical operator corresponds to a "ROT-R1" operation, i.e. the last bit of the challenge replaces the first bit of the challenge. By so doing, all the 15 subsequent bits of the challenge are moved by one position. Referring back to the example illustrated above wherein:

| | |
|---|---|
| Image data: | 0111001011001101 |
| ROT-R1 result: | 1011100101100110 |

Assuming the challenge provides such instructions, a combination of the ROT-R1 encoding with a further encoding system as for example a XOR logical operator results when:

| | |
|---|---|
| The image data is: | 0111001011001101 |
| ROT-R1 result is: | 1011100101100110 |
| The challenge is: | 0010110101100111 |
| Therefore, the encoded image data is: | 1001010000000001 |

The encoded image is transmitted to the host processor, which decodes it by retrieving the challenge and performing the reverse operations of the ones indicated in the challenge. Once decoded, the image data is processed according to an authentication process such as a comparison of the image data with stored templates. Depending on the result of the comparison, the processor authenticates or fails to authenticate the user.

Of course, a ROT-R1 encoding operation is cited for exemplary purpose. There is no limitation on the type of rotation and of the level of rotation that can be performed. In the present example, a level one was illustrated but a level 2 or 3 and so on are usable operations. Furthermore, here a right rotation is shown, which means that the last bit is moved to the front position of the challenge. A rotation of the second level means that the last two bits are moved from the two last positions to the two first positions of the challenge—a ROT-R1(2)—and so forth. Conversely, in a left rotation operation, the first bit is moved to the last position and so on. Of course, this is when considering an occidental way of writing, i.e. from the left to the right.

Among the numerous usable operations, another example is to provide instructions in the instruction portion of the challenge to combine an XOR operation and to intercalate consecutive sets of four consecutive bits from the challenge after every set of consecutive four bits of the image data. For illustrative purpose, referring to the above image data and challenge, the resulting encoded image is as follows:

| | |
|---|---|
| The image data is: | 0111001011001101 |
| The challenge is: | 0010110101100111 |
| XOR encoding result: | 0101111110101010 |

The resulting encoded image is the following 32-bits string: 01010010111111011010011010100111

The encoded image is transmitted to the host processor, which decodes it by retrieving the challenge and performing reverse operations to those indicated in the instruction section of the challenge. Once decoded, the image data is processed according to an authentication process such as a comparison of the image data with stored templates. Depending on the result of the comparison, the processor authenticates or fails to authenticate the user.

Of course, a combination of a plurality of operations is not a requirement; it is a possibility. In the previous example, the number of consecutive bits from the challenge constituting sets of bits to intercalate within the image data after a specific number of consecutive bits, and the specific number of consecutive bits were arbitrarily chosen to be 4. However, this number can be arbitrarily chosen to be another number.

Of course, when a timing device is included in the sensor, the operation and challenge is modifiable in accordance therewith. For example, a ROT-R(1) is used between 1 and 2 PM and a ROT-R(2) is used between 2 and 3 PM. In the AM, for example, a ROT-L is used accordingly.

Alternatively, the number of consecutive bits from the challenge constituting sets of bits to intercalate within the image data after a specific number of consecutive bits, and the specific number of consecutive bits are different.

Figure 6A:
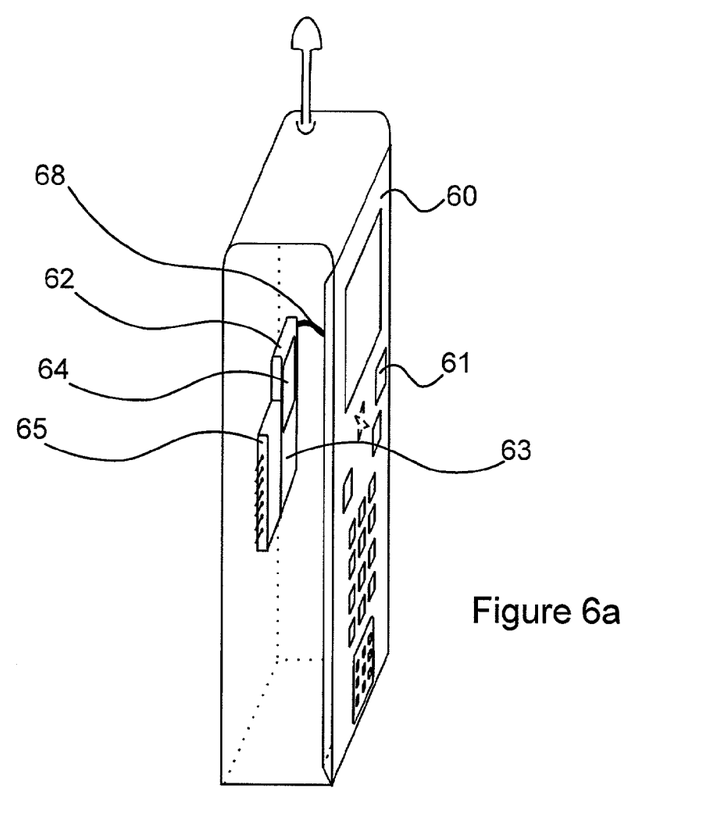
FIG. 6a is an exemplary illustration of a protected device housing a host processor comprising a connecting system for engaging a removable sensing device incorporating the encoding circuit.

Referring to FIG. 6a, an exemplary illustration of a protected device housing a host processor comprising a connecting system for engaging a removable sensing device is shown. A protected device, in the form for example of a regular cell phone 60 as illustrated. The cell phone comprises an on/off switch 61. The cell phone 60 houses a host processor 62, which comprises a challenge generator 63 automatically generating and sending challenge to a sensing processor incorporated within the sensing device in the form of a capacitive array swipe sensor as shown in FIG. 6c. The arrays comprise sensing elements 67, which are designed to sense induced electrical charge. The distance between the fingertip and individual sensing elements should generally be kept to a very small gap in order to retain a high signal to noise ratio. Preferably, the host processor 62 comprises a volatile memory 64 for temporarily storing the generated challenge such that the challenge is retrievable for use in an authentication process.

The host processor is connected to the protected device 60 through the connection 68. After an authentication procedure is preformed and in the case where a user is authenticated, the host processor communicates with the protected device through the connection 68 to allow, for example the protected device to operated according to pre-determined parameters. Conversely, when the host processor fails to authenticate a user, either the host processor does not communicate with the protected device, which therefore is not operative, or the host processor communicates instructions to the protected device so as not to switch to an operative mode.

Figure 6B:
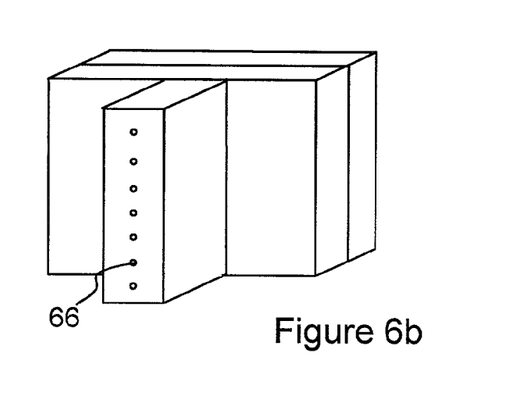
FIG. 6b is a bottom view of the removable sensing device incorporating the encoding circuit.
Figure 6C:
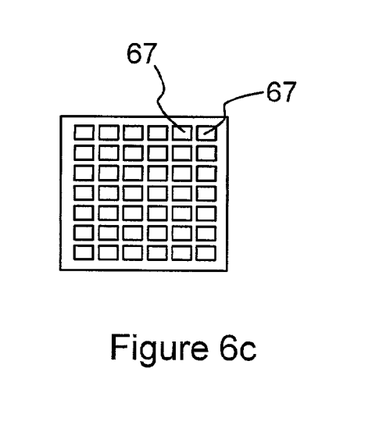
FIG. 6c is a top view of the removable sensing device incorporating the encoding circuit.

Advantageously, the host processor comprises a plurality of plugs 65 for engaging a plurality of sockets 66 as in FIG. 6b attached to the sensing device. Of course, the plurality of plugs is identical to the plurality of sockets. The presence of plugs and sockets facilitate a removal and connection of the sensing device incorporating the encoding circuit with the host processor housed within a protected device, as for example the cell phone of FIG. 6a. The sockets are located on the removable sensing device and the plugs are attached to the host processor for protecting the plugs from being damaged when the sensing device is removed for maintenance purpose for example. Having the plugs attached with the protected device also prevents dust accumulation which eventually prevents for a good contact between the host processor and the sensing device.

Optionally, the plurality of plugs is attached to the host processor and the plurality of sockets is attached to the sensing device. However, this is not a preferred embodiment since the plugs are exposed to potential damages when the sensing device is removed from its connected position.

Figure 7A:
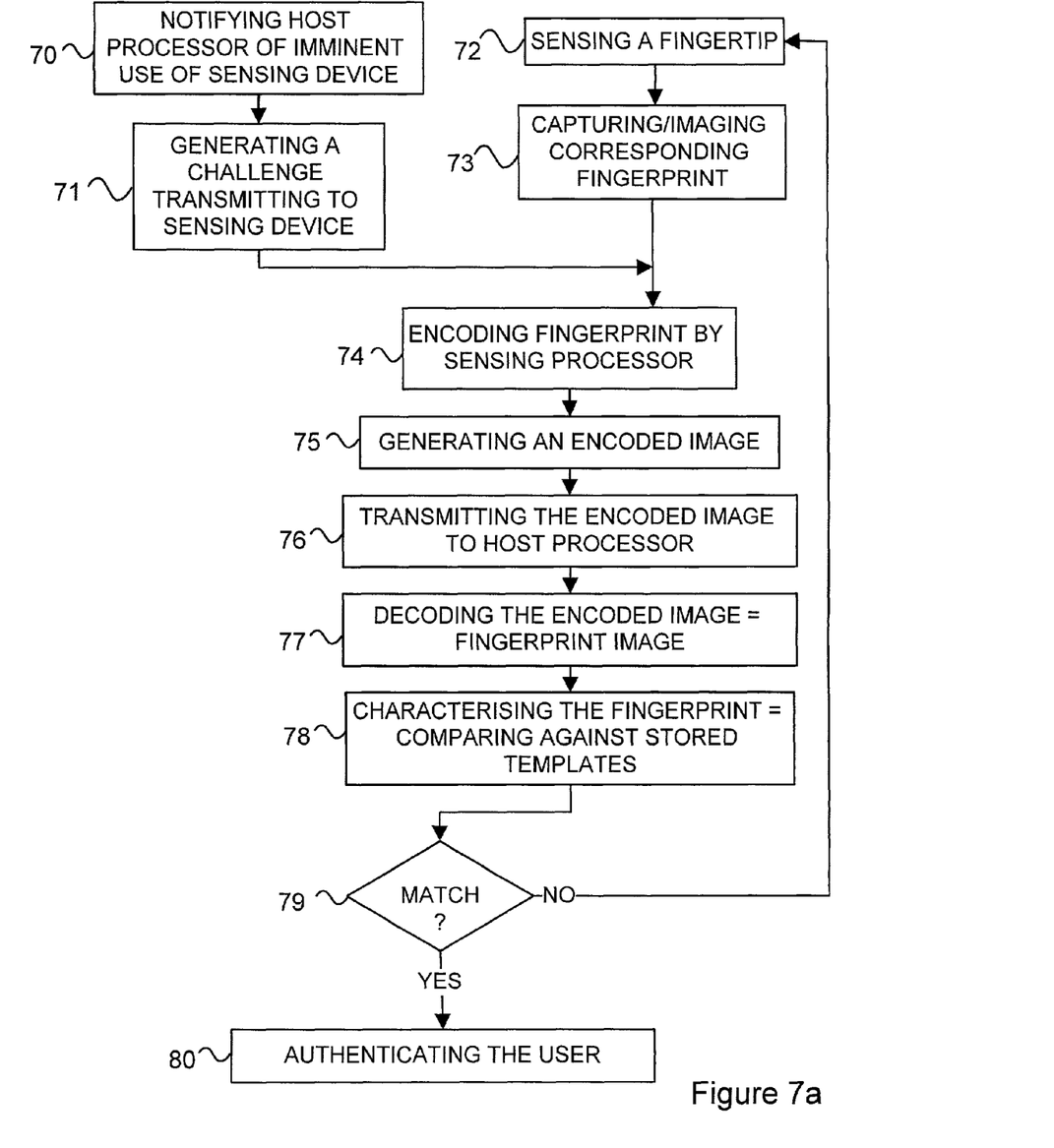
FIG. 7a is flow chart diagram of a method of encoding image data according to the present invention; and, FIG. 7b is flow chart diagram of a method of encoding image data wherein the method comprises the step of synchronizing signals from the host processor and the sensing device according to the present invention.

Referring to FIG. 7a, a flow chart diagram of a method of encoding a fingertip image for identifying a source of an image sensor according to the present invention is shown. A user willing to use a device as the cell phone of the previous example turns an on/off switch 61 to switch the device from an inoperative mode to an operative mode. In the case of a protected device, activating the device in step 70 is a signal notifying the host processor of an imminent use of the sensing device. Such a notification causes the host processor to automatically generate a challenge in step 71, the challenge in the form for example of a string of bits as exemplified previously or the challenge comprises characters, a mix of characters and bits and so forth. The challenge is transmitted to the processor associated with the sensing device. In parallel, the user uses the sensing device at 72 by swiping a fingertip on a capacitive sensor for example; a processor incorporated within the sensing device captures an image of the fingertip for imaging the corresponding fingerprint in step 73. In 74, the processor uses the challenge and the encoding instructions included within the challenge for encoding the imaged fingerprint for generating encoded image data in step 75. The encoded image data is transmitted to the host processor in step 76. The host processor, by retrieving the challenge, decodes the encoded image data in 77, which corresponds to the fingerprint image. The following step 78 represents the verification of the fingerprint by comparing the fingerprint with stored templates. In the case of positive match in step 79, the host processor authenticates the user in 80. Optionally, no match is found between the fingerprint image and stored templates in 80, therefore the host processor fails to authenticate the user who eventually tries again a new authentication procedure.

Optionally, in case of failure in the authentication process, the user is prompted by the protected device to provide again a fingertip on the swiping device.

Figure 7B:
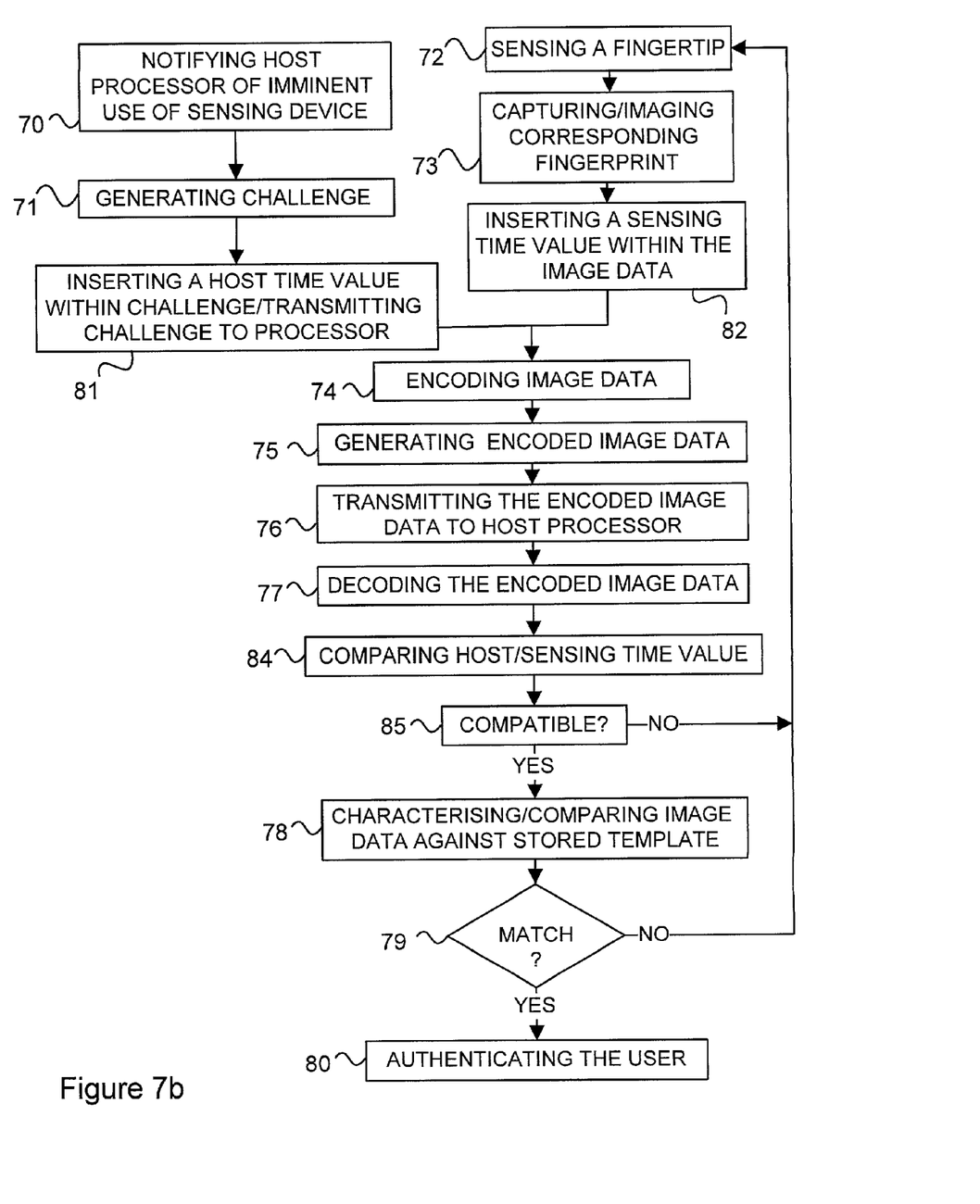

Referring to FIG. 7b, a flow chart diagram of a method of encoding a fingertip image wherein time values are inserting for synchronizing signal for preventing a play back of a recorded fingerprint according to the present invention is shown. A user willing to use a device as the cell phone of the previous example turns an on/off switch 61 to switch the device from an inoperative mode to an operative mode. In the case of a protected device, activating the device in step is a signal 70 notifying the host processor of an imminent use of the sensing device. Such a notification makes the host processor to automatically generate a challenge in step 71, the challenge in the form for example of a string of bits as exemplified previously or the challenge comprises characters, a mix of characters and bits and so forth.

The host processor inserts in step 81 a host time value within the challenge. Alternatively, the host processor assigns a host time value to the challenge while generating the challenge, and the host time value is used as a tag for use in synchronization recognition. Alternatively, the time value is temporarily stored concurrently with the challenge in the volatile memory as mentioned in FIG. 4, and the host time value for further retrieval and use for comparing against a sensing time value inserted within the image data in step 82. The image data corresponding to an image of a fingertip sensed in step 72 from which a fingerprint was captured and imaged in step 73. The challenge is transmitted to the processor associated with the sensing device. In step 74, the processor uses the challenge and the encoding instructions included within the challenge for encoding the imaged fingerprint for generating encoded image data in step 75. The encoded image data is transmitted to the host processor in step 76. The host processor, by retrieving the challenge, decodes the encoded image data in step 77, which corresponds to the fingerprint image.

The host processor retrieves the host time value from the volatile memory or from the challenge and compares in step 84 the host time value and the sensing time value to determine whether they are both compatible. A compatibility of time values means that the difference between the host time value and the sensing time value is within predetermined limits.

When the time values are compatible, the following step 78 represents the verification of the fingerprint by comparing the fingerprint with stored templates. In the case of a positive match in step 79, the host processor authenticates the user in 80. Optionally, no match is found between the fingerprint image and stored templates in 80, therefore the host processor fails to authenticate the user who eventually tries again a new authentication procedure.

Optionally, the time values are not compatible and the host processor does not accept the fingerprint image. Therefore, no authentication process is performed and the user is eventually prompted to provide again a fingertip to the sensing device.

Alternatively, the time values are used to select an encoding method or a portion of the challenge data such that absent a synchronized time source, mimicking of the sensor is extremely difficult or impossible.

Numerous other embodiments may be envisaged without departing from the spirit and scope of the invention.

What is claimed is:

1. A method for authenticating a sensor, the method comprising:
    receiving a biometric sample at the sensor, wherein the sensor comprises a swipe contact imager, and wherein receiving a biometric sample comprises receiving a swipe of a fingertip across the swipe contact imager;
    capturing a biometric image indicative of the biometric sample;
    generating biometric image data indicative of the biometric image, wherein the biometric image data comprises a sequence of bits having bit values;
    receiving a challenge from a processor;
    encoding the biometric image data based at least in part on the challenge, wherein encoding the biometric image data comprises evaluating a majority of the bit values of the bits of the biometric image data based at least in part on the received challenge; and
    transmitting the encoded biometric image data to the processor for authentication of the sensor.

2. The method of claim 1 wherein receiving a challenge comprises receiving a challenge having data indicative of at least an encoding operation.

3. The method of claim 1, further comprising receiving a time value from a timing device.

4. The method of claim 3 wherein encoding the biometric image data comprises inserting data indicative of the time value within the encoded biometric image data.

5. The method of claim 4 wherein the time value is a first time value and wherein receiving a challenge comprises receiving a challenge that comprises a second time value for use in determining compatibility between the inserted data and the first time value.

6. The method of claim 5 wherein determining compatibility comprises evaluating whether a difference between the first time value and the second time value is within predetermined limits.

7. The method of claim 6 wherein the processor is a first processor and wherein determining compatibility is for ensuring synchronization between the first processor and a second processor associated with the sensor.

8. The method of claim 3 wherein encoding the biometric image data comprises determining an encoding operation based on the time value.

9. The method of claim 3 wherein the time value is a first time value and wherein encoding the biometric image data comprises determining further challenge data within the sensor based on the first time value, the further challenge data being determined independently by the processor based on a second time value retrieved thereby other than from the sensor.

10. The method of claim 1 wherein encoding the biometric image data comprises reversibly encoding the biometric image data.

11. A device for generating encoded biometric image data in response to a challenge provided by a first processor that is to receive the biometric image data for authentication of the device, the device comprising:
    a transceiver configured to receive a challenge from the first processor for use in authenticating the device and provide a response to the first processor;
    a sensing pad configured to sense a biometric information sample, wherein the sensing pad comprises a swipe contact imager; and
    a second processor electrically coupled to the sensing pad, the second processor configured to—
        encode the biometric image data in response to the challenge received at the transceiver from the first processor, wherein the biometric image data is generated from the biometric information sample, wherein the biometric image data comprises a sequence of bits having bit values, and wherein encoding the biometric image data comprises evaluating a majority of the bit values based at least in part upon the received challenge; and
        provide the encoded biometric image data to the transceiver for transmission to the first processor for authentication of the device.

12. The device of claim 11 wherein the second processor comprises a plurality of individual encoding circuits, the plurality of individual encoding circuits for independent use in dependence upon the challenge.

13. The device of claim 11, further comprising a sensor clock configured to generate a sensor time value associated with the biometric image data, the sensor time value being different for different biometric image data, and wherein the second processor comprises a circuit configured to encode the sensor time value within the encoded biometric image data.

14. The device of claim 11, further comprising a sensor clock configured to generate a sensor time value associated with the biometric image data, the sensor time value being different for a different biometric image data, and wherein the second processor comprises individual encoding circuits responsive to the sensor time value for encoding the sensed biometric image data based on the sensor time value, wherein some sensor time values result in activation of different individual encoding circuits from others.

15. A biometric authentication system, comprising:
    an imaging device; and
    a first processor comprising—
        a challenge generator configured to generate a challenge upon reception of data indicative of an imminent use of the imaging device;

a first transceiver configured to transmit the challenge to the imaging device and receive encoded biometric image data from the imaging device; and a storage medium configured to store the challenge;

wherein the imaging device comprises— a second transceiver configured to receive the challenge from the first processor;

a sensing pad configured to sense a biometric information sample; and a second processor electrically coupled to the sensing pad, wherein the second processor is configured to—receive the sensed biometric information sample;

generate biometric image data from the sensed biometric information sample, wherein the generated biometric image data comprises a sequence of bits having bit values;

encode the generated biometric image data based at least in part on the received challenge, wherein encoding the generated biometric image data comprises evaluating a majority of the bit values of the bits based at least in part on the received challenge; and provide the encoded biometric image data to the second transceiver for transmission to the first processor for authentication of the imaging device.

16. The biometric authentication system of claim 15, wherein the first processor further comprises a clock configured to generate a time value and assign the time value to the challenge, the time value being different for a subsequent challenge.

17. The device of claim 11, further comprising a sensor clock configured to generate a sensor time value associated with the biometric image data, the sensor time value being different for different biometric image data, and wherein the second processor comprises a circuit for encoding in a fashion indicative of the sensor time value, wherein the sensor time value and a time value associated with the first processor are for use in verifying synchronization of the sensing pad and the first processor.

18. The device of claim 11, further comprising a mating connector configured to facilitate engaging with an apparatus.

19. A biometric authentication system comprising:

a processor; and a storage medium electrically coupled to the processor and having instructions stored thereon that, when executed by the processor, cause the processor to perform an authentication method, the authentication method comprising— generating a challenge;

storing the challenge;

transmitting the challenge to a sensor;

receiving encoded biometric image data from the sensor, wherein the biometric image data, prior to being encoded, is generated from a biometric image sample received from a user and comprises a sequence of bits having bit values, and wherein the encoded biometric image data is produced by evaluating a majority of the bit values based at least in part on the challenge;

decoding the encoded biometric image data based on the challenge;

performing one of authorizing the sensor and failing to authorize the sensor using the challenge; and performing one of authenticating the user and failing to authenticate the user using the decoded biometric image data.

* * * * *